United States Patent [19]

Rahman

[11] 4,010,977
[45] Mar. 8, 1977

[54] TWO POSITION SEAT AND LOCK

[75] Inventor: Habibur Rahman, Detroit, Mich.

[73] Assignee: Massey-Ferguson Inc., Detroit, Mich.

[22] Filed: Aug. 25, 1975

[21] Appl. No.: 607,313

[52] U.S. Cl. .................................. 297/92; 297/364
[51] Int. Cl.² ............................................ B60N 1/02
[58] Field of Search ...... 297/93, 344, 92, 326–328, 297/363–365; 248/382–385, 371, 397, 398

[56] References Cited
UNITED STATES PATENTS

| 358,454 | 3/1887 | Johnson | 297/93 |
|---|---|---|---|
| 2,613,725 | 10/1952 | Woodhall | 297/363 |
| 3,243,228 | 3/1966 | Watts et al. | 297/92 |
| 3,246,926 | 4/1966 | Link | 297/93 |
| 3,306,172 | 1/1967 | Noller et al. | 297/93 X |
| 3,751,740 | 8/1973 | Belk | 297/92 X |
| 3,784,252 | 1/1974 | Peterson | 297/364 |

*Primary Examiner*—James C. Mitchell
*Attorney, Agent, or Firm*—Thomas P. Lewandowski

[57] ABSTRACT

A seat for mobile material handling equipment which is movable between two different seating positions about a horizontal, transverse axis and is provided with a lock mechanism which securely holds the seat in either of its two positions.

6 Claims, 3 Drawing Figures

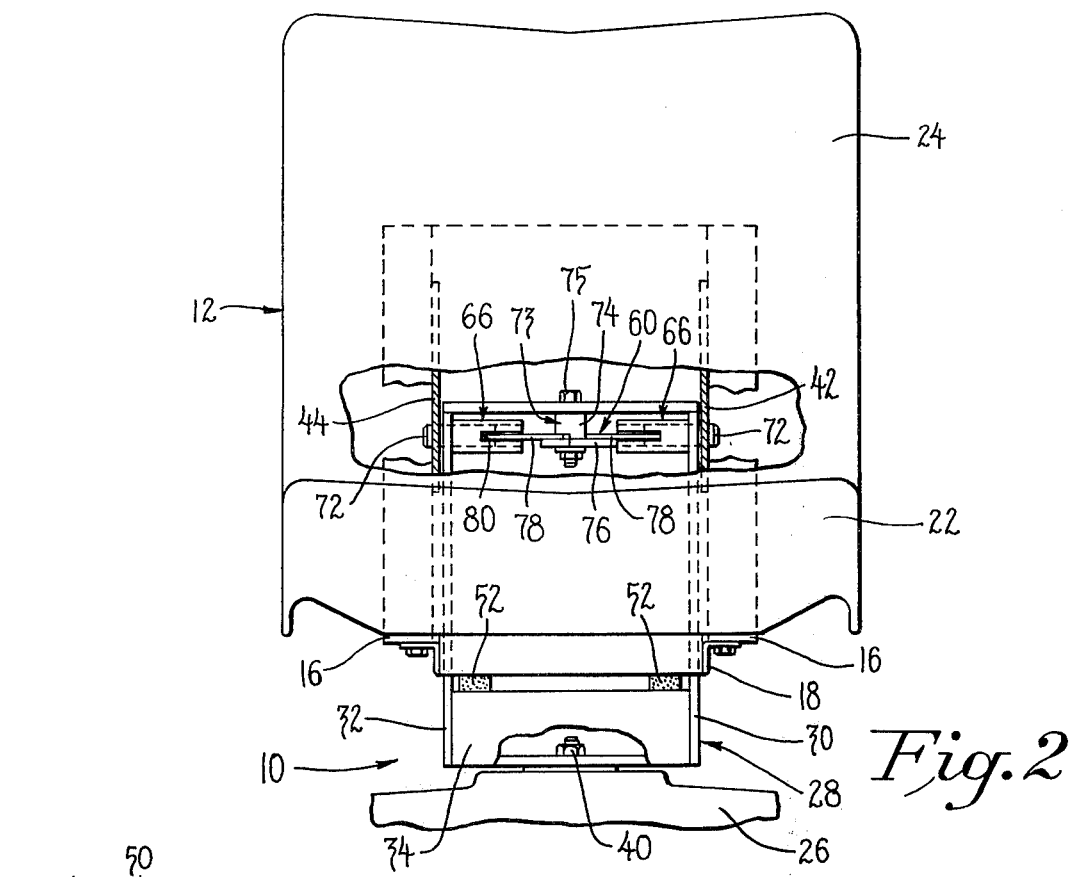

TWO POSITION SEAT AND LOCK

With construction equipment and material handling equipment such as a tractor mounted backhoe, the operator faces forwardly when maneuvering the tractor and faces rearwardly when operating the controls for the material handling equipment. It is desirable that the operator's seat for such equipment be usable in either of its two positions and preferably so that the same seat can be adjusted to face in opposite directions. In either of its two positions it is desirable for the seat to be locked and maintained in a firm, fixed position.

It is an object of this invention to provide a two position seat which can be pivoted about a transverse axis to a selected one of two positions.

Another object of the invention is to provide a two position seat having a lock arrangement firmly maintaining the seat arrangement in either of its selected positions.

A two position seat assembly is provided having a pair of identical cushion portions, one of which acts as a backrest when the seat assembly is in one position and the other which acts as the backrest when the seat assembly is in the other of its positions. The seat is pivotally mounted for movement between its positions about a pivot assembly which also incorporates a double plunger lock arrangement in which the plungers are moved simultaneously by a single control lever to engage aligned openings in the seat assembly and its support.

FIG. 2 is a front elevation of the seat assembly seen in FIG. 1; and

FIG. 3 is a view taken generally on line 3—3 in FIG. 1.

Figure 1:
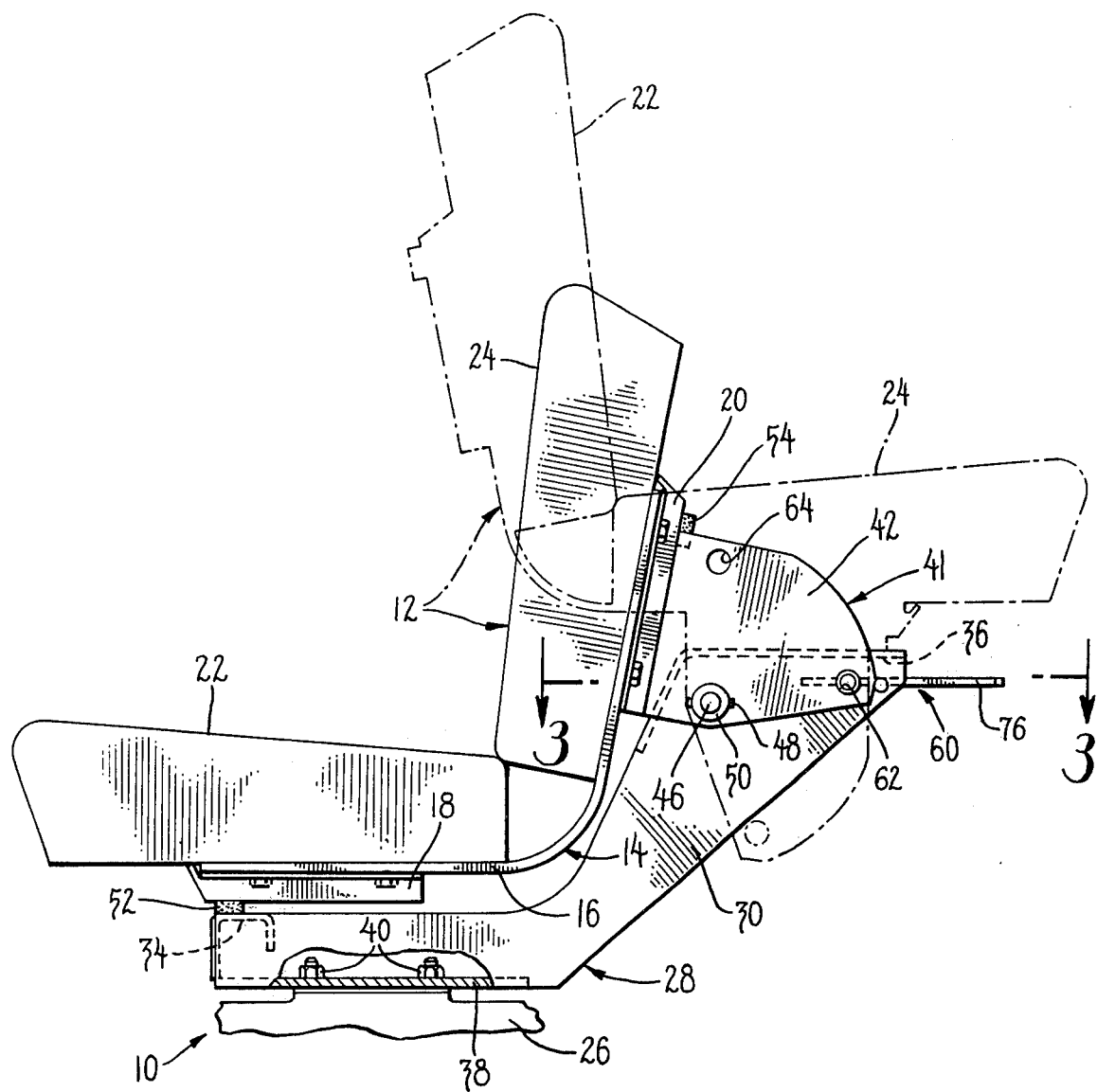
FIG. 1 is a side elevation of the seat arrangement embodying the invention.

The seat arrangement embodying the invention is designated at 10 and is particularly adapted for use on load handling machinery such as a tractor having a backhoe mounted thereon. The seat arrangement includes a seat assembly 12 having a frame 14 including a pair of parallel spaced, L-shaped frame bars 16. The frame bars 16 are held in fixed spaced relationship by a transversely extending support member 18 secured to one leg of each of the L-shaped bars and a similar support member 20 secured to each of the other legs of the L-shaped bars. A pair of body support cushions or portions 22 and 24 are secured to the L-shaped bars 16 by bolts or the like so that thay are held in angularly disposed relationship to each other.

The seat assembly 12 is mounted on the vehicle, such as a tractor, a portion of which is designated at 26 by a mounting structure 28. The mounting structure 28 includes a pair of longitudinally extending plate members 30 and 32 extending generally longitudinally of the vehicle. The plate members 30 and 32 are held in fixed, spaced apart relationship by a transverse channel member 34 at the forward ends of the plate members, a cross member 36 at the rear of the plate members, and an intermediate plate member 38, all of which are disposed in transverse relationship to the vehicle and are secured to the plate members 30 and 32 as by welding or the like. The plate members 30 and 32 and the members 34, 36 and 38 form a rigid, unitary support structure which is secured to the vehicle body 26 by means of fasteners indicated at 40.

The seat frame 14 is provided with a pivot support 41 formed by a pair of parallel transversely spaced bracket members 42 and 44 which are rigidly fastened to the support member 20 at the rear of the body support portion 24. The bracket members 42 and 44 are disposed outboard of the plate members 30 and 32, respectively. A pivot shaft 46 passes through aligned apertures in the plate members 30 and 32 and the brackets 42 and 44 and is held against axial displacement by means of pins 48 passing through the shaft 46 and collars 50 positioned on the opposite ends of the shaft. The shaft 46 forms a pivot axis about which the seat assembly 12 may be moved between the first position illustrated in full lines in FIG. 1 and a second, elevated position illustrated in broken lines. In the full line position shown in FIG. 1, the seat assembly 12 is positioned for operation of the tractor or vehicle on which the load handling machinery is mounted and the body support portion 22 forms the seat and the body support portion 24 forms a backrest. In the broken line position of the seat assembly 12, the cushion 24 forms the seat and the cushion 22 forms the backrest and the seat is positioned in an elevated attitude relative to the first position to afford a seated operator greater access to controls and visibility of the load handling machinery which he is controlling.

In the first, lower elevation of the seat assembly 12 a pair of resilient stop elements 52 engage the channel member 34 to determine the first lower position of the seat shown in full lines in FIG. 1. Similarly, a pair of resilient stop elements 54 are secured to support member 20 and engage the cross member 36 to determine the second, elevated position of the seat assembly 12 shown in broken lines in FIG. 1.

The seat assembly 12 is locked in either of its two positions by a lock arrangement 60 formed in part by the bracket elements 42 and 44. The bracket elements 42 and 44 act as quadrants each of which has a pair of plunger receiving openings 62 and 64. The openings 62 and 64 are spaced from each other and at an equal distance from the axis of the shaft 46. The openings 62 and 64 and the bracket 42 are laterally aligned with identical openings 62 and 64 in the other bracket element 44.

Referring now to FIGS. 2 and 3, disposed between the plate members 30 and 32 and mounted thereon are a pair of plunger assemblies 66 each of which includes a housing 68 secured as by welding to the inboard sides of each of the associated plate members 30 and 32. The housings 68 are tubular and their bores are in alignment with openings 70 in each of the associated plate members 30 and 32. Slideably disposed in each of the housings 68 are plungers 72 which are adapted to slide axially of the housings 68 and through the openings 70.

When openings 70 in the plate members 30 and 32 are in alignment with apertures 62 and 64, the plungers 72 are able to slide through the aligned apertures 62 or 64 to maintain the seat assembly 12 locked in the selected one of its two positions.

Disposed between the tubular housing members 68 and connected to the cross member 36 is a vertically disposed pivot post 73. The pivot post 73 includes a spacer 74 and a bolt 75 which supports the lever 76 for swinging movement in a generally horizontal plane below the body portion 24 when the seat assembly 12 is in its elevated position. The lever 76 is connected to the pair of plungers 72 by means of a pair of links 78. The links 78 each have one of their ends positioned in a slot 80 in the inboard ends of each of the plungers 72 and are fastened to the plungers by means of pins 82. The opposite ends of the links 78 are pivotally connected by pins 84 to the levers 76 at opposite sides of the pivot post 74. The inboard end of the tubular housing 68 associated with the plate member 30 is provided with a slot 86 to afford clearance for the associated link 78 during movement of the lever 76. Similarly, the inboard end of the tubular housing 68 associated with the plate member 32 is provided with a slot 86 affording clearance for the associated link 78. The free end of the lever 76 affords a handle portion 90 by which the lever 76 may be moved in a horizontal plane to latch and unlatch the seat assembly 12 relative to mounting structure 28 so that the seat assembly 12 is locked firmly in a selected one of its two positions.

Swinging movement of the lever 76 is effective to simultaneously move both of the plungers 72. As seen in FIG. 3, movement of the lever 76 in a counterclockwise direction is effective to move the plungers toward each other in which case the plungers disengage from the selected apertures 62 or 64 in the bracket elements 42 and 44 so that the seat assembly 12 may be pivoted about the shaft 46 to the other of its positions.

Referring to FIG. 3, the pair of plungers 68 are urged outwardly to their locking position by means of a compression spring 92 supported on a rod 94, one end of which is slideably supported in an opening in the plate member 32 and the other end of which is pivotally connected to the lever 76 by means of one of the pins 84. The compression spring continuously biases the lever 76 in a clockwise direction to urge the plungers 78 to their locked positions.

A two position seat for a vehicle has been provided in which a seat assembly having a pair of cushioned portions may be moved between positions in which one cushion portion forms the backrest when the seat assembly is in one position and the other cushion portion forms the backrest when the seat assembly is in the other of its positions. In either of its positions, the seat assembly is locked firmly in position against movement by a dual plunger lock arrangement which is operated by a single lever to move both of the plungers simultaneously to unlatch or to lock the seat assembly in a selected one of its two positions.

The embodiments of the invention in which an exclusive property or privilege is claimed are defined as follows:

1. A two position vehicle seat supported on a vehicle portion comprising: a pair of parallel plate members extending longitudinally of a vehicle and vertically upward, a seat assembly having a pair of body supporting portions disposed at an angle to each other, a pivot member pivotally connecting said seat assembly to said plate members for movement about a transverse axis spaced from the vehicle portion, a bracket member mounted on one of said body supporting portions, said bracket member forming a pair of apertures spaced from each other and equally spaced from said transverse axis, one of said plate members forming an aperture also equally spaced from said transverse axis and coincidental alternately with the apertures of said bracket member, lock means for maintaining one of said body supporting portions in a position below said transverse axis to form a seat and for maintaining both said supporting portions above said transverse axis in a second position where said one supporting portion forms a backrest and the other supporting portion a seat, said lock means including a lock assembly movably supported on one of said plate members for engagement with the apertures of one of said plate members and one of the apertures of said bracket member simultaneously when said seat assembly is in one of its positions.

2. The combination of claim 1 in which said bracket member is one of a pair of bracket members mounted on said one supporting portion in parallel spaced relation to each other and in which said movable lock element is simultaneously engageable with both of said bracket members.

3. The combination of claim 1 in which said lock means includes a pair of bracket members disposed in parallel relation to each other, each of said brackets forming a pair of apertures transversely aligned with the pair of apertures of the other of said brackets, said apertures in each of said brackets being spaced from each other and being equally spaced from said transverse axis, said movable lock assembly including a pair of plungers movable transversely into selected ones of said transversely aligned apertures to maintain said seat assembly in a selected one of its said positions.

4. The combination of claim 3 and further comprising means for simultaneously moving said pair of plungers into and out of engagement with said apertures.

5. The combination of claim 4 and further comprising resilient means biasing said plungers toward a position maintaining the latter in said apertures.

6. The combination of claim 4 in which said means for simultaneously moving said plungers includes a lever member pivotally mounted relative to said plate members, and a pair of link elements connecting said lever member to said plungers.

* * * * *